April 27, 1965 A. J. MOSER 3,180,937

TELEPHONE AMPLIFIER

Filed Nov. 8, 1962

ARTHUR J. MOSER
INVENTOR.

BY R. E. Geauque

ATTORNEY

United States Patent Office 3,180,937

Patented Apr. 27, 1965

3,180,937
TELEPHONE AMPLIFIER

Arthur J. Moser, 14329 Hatteras St., Van Nuys, Calif.

Filed Nov. 8, 1962, Ser. No. 236,375
11 Claims. (Cl. 179—1)

This invention relates to a telephone amplifier and, more particularly, to an improved self-contained electronic device which may be coupled to the receiver portion of a telephone handset for the purpose of providing a selectively variable amount of amplification of the receiving signal.

To overcome hearing difficulties when using the telephone it has been proposed heretofore to incorporate an amplifier into the telephone or subscriber set installed at the user's location. However, this does not solve the problem of hearing difficulties for an individual required to use a telephone away from his own location such as a public telephone. Also, noisy conditions sometimes prevail at certain locations which would require the use of amplification means for persons who are not necessarily hard of hearing. Thus, it becomes desirable to provide means for amplifying the telephone signal as required whether it is at a given location or when moving from place to place.

There is provided by the present invention a compact amplification device which may be conveniently carried from place to place by an individual and which may be easily installed on the receiver of a conventional telephone handset without the need of tools or special appliances. The device is held in place by means of an elastic band and does not require any external electrical connections. It is provided with an adjustable volume control so that the degree of amplification may be conveniently controlled by the user. The device employs a self-contained battery which may be readily replaced without the need of tools of any kind. If desired the device may be left on the telephone when not in use.

It is therefore the principal object of the invention to provide a novel, compact, and improved self-contained amplifier for attachment to a telephone receiver to obviate hearing difficulties.

Another object of the invention is to provide a novel self-contained transistorized amplifier adapted for amplifying the output from a telephone receiver.

Another object of the invention is to provide a novel and improved portable telephone amplifier.

A general object of this invention is to provide a new and improved telephone amplifier which overcomes disadvantages of previous means and methods heretofore intended to accomplish generally similar purposes.

Other advantages, features and objects of the present invention will become manifest to those versed in the art upon making reference to the detailed description and the accompanying drawings in which a preferred structural embodiment, incorporating the principles of the present invention is shown by way of illustrative example.

In the accompanying drawings FIGURE 1 is a perspective view of the device of the invention showing the manner in which it is attached to a telephone receiver.

Like numerals refer to like parts throughout the several views.

Figures 1, 2, 3:
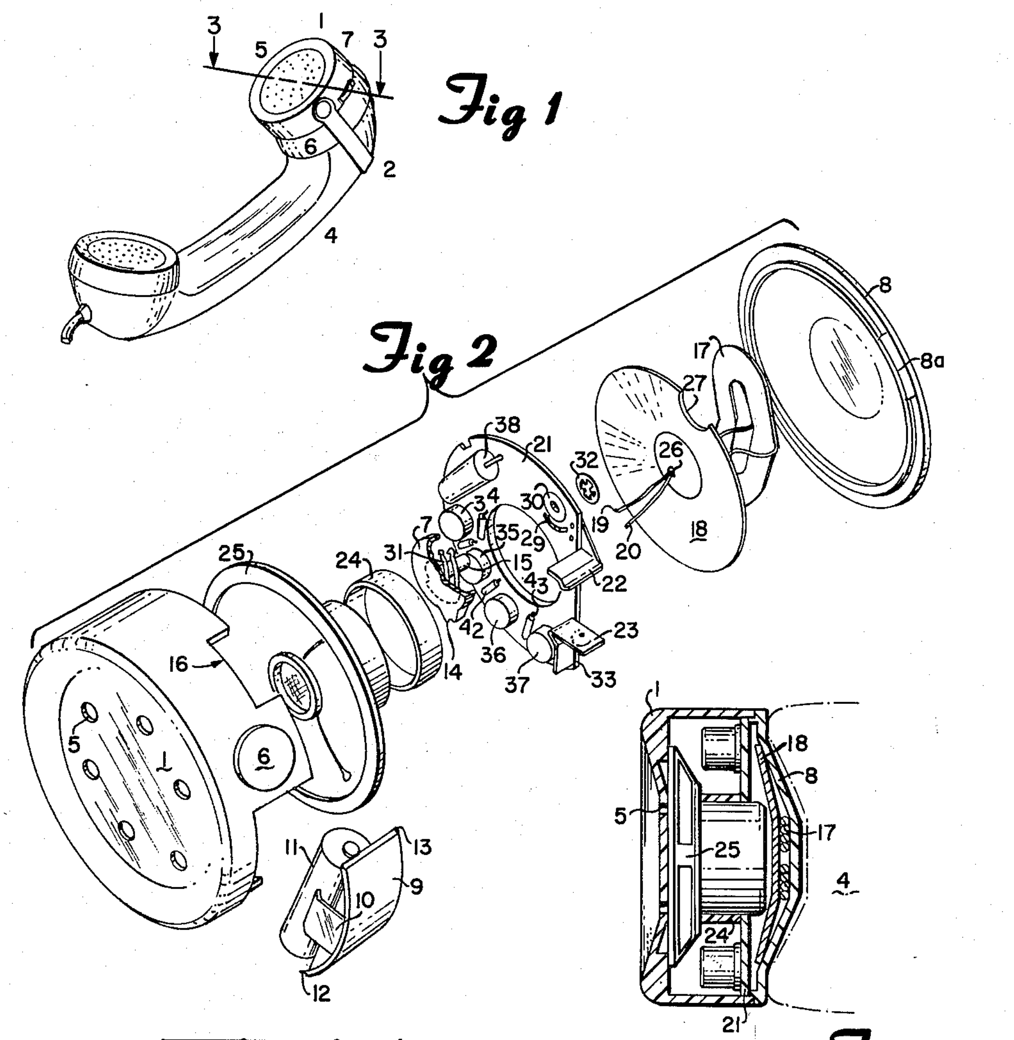
FIGURE 2 is an exploded view showing the elements comprising the device of FIGURE 1.
FIGURE 3 is a sectional view taken along line 3—3 of FIGURE 1.

Looking now at FIGURE 1 there is shown a perspective view of the apparatus of the present invention which comprises an enclosing housing 1 of generally cylindrical configuration and having an elastic strap or band 2 for holding the device to the receiver portion of a telephone handset 4. The exposed face of housing 1 is provided with perforate apertures (5) through which the amplified sound may emanate. A pair of bosses, one of which is shown at 6, are provided to fasten band 2 to housing 1. Band 2 may be fabricated from rubber, neoprene or other suitable material and may be colored to match the color of housing 1. The single operating control comprises a thumb wheel 7 which extends through an opening in the side wall of the housing 1 and is used to turn the device off and on and to regulate the amplifier gain as will appear hereinafter. The front of housing 1 may be provided with an inwardly depressed or dish-shaped surface resembling the front surface of the receiver portion of handset 4 and will thus comfortably conform to the ear of the user. Housing 1 is enclosed by rear cover 8, as can be seen in FIGURES 2 and 3. Cover 8 has an outwardly extending frusto conical surface which is adapted to mate with the concave depression in the receiver portion of handset 4. The cover 8 may be fabricated from plastic or other non-magnetic material, for reasons which will be made evident hereinafter. The edge of cover 8 is provided with an extended portion 8*a* which is adapted to mate with a portion of recess 16 and thereby key the housing 1 to cover 8.

The side wall of housing 1 is provided with a removable section 9 which carries the battery holder 10 thus facilitating replacement of the dry cell 11 used to power the device, when required.

Section 9 comprises an arcuate wall section having a transverse base portion adapted to support holder 10. A spring clip, comprising holder 10, having a shape to conform to the cylindrical cross section of the cell 11 extends upwardly from the transverse base portion of section 9 and is attached thereto by any suitable means. One end of the battery holder 10 is provided with an interior lip 12 and the opposite end is provided with an exterior lip 13, the first of which slides under and engages a mating portion of the cylindrical housing 1. The terminals of cell 11 engage clips 22 and 23 when section 9 and housing 1 are assembled. The clips (22–23) are mounted on circuit board 21 which also supports the components of the amplifier.

A pickup coil 17 is located on the interior frusto-conical surface of cover 8 and is isolated from the remaining portion of the interior of housing 1 by means of shield member 18. Shield 18 has a shallow, generally conical shape and is preferably fabricated from Armco magnetic ingot iron sheet, or other suitable material having a high permeability. In a typical construction, the sheet metal from which shield 18 is made, may be 0.03 inch thick. The magnetic permeability of shield 18 isolates pickup coil 17 from the external field of loudspeaker 25, plus preventing undesirable feedback. Shield 18 has a central aperture 26 through which lead wires 19 and 20, from coil 17, may pass. Shield 18 is also provided with a peripheral notch 27 to provide clearance for certain of the components mounted on circuit board 21, as will appear hereinafter.

The output of the receiver portion of hand set 4 is inductively coupled into pickup coil 17, is amplified, and is converted to an acoustical output by means of loudspeaker 25. Inductive coupling between the telephone and the amplifier of the invention prevents the amplification of spurious noise and also overcomes the problem of acoustic feedback which might otherwise occur if the telephone output were to be picked up acoustically as by means of a microphone or the like. Pickup coil 17 is preferably wound in the form of a flat oval such as shown in FIGURE 2 and is thereafter bent or formed to a 155° angle to conform to the interior contour of cover 8. An oval shape of pickup coil 17 is preferred to a circular shape in order to optimize the coupling, regardless of the relative orientation between the output coil of the telephone receiver and pickup coil 17.

If desired the single oval coil 17 may be replaced by a pair of series-connected circular coils in which instance the coupling to the telephone handset 4 is somewhat more dependent upon relative orientation.

The device is turned on and off, and the amplifier gain adjusted by means of thumb wheel 7. Because of its relatively small size, wheel 7 is provided with a ribbed peripheral edge to facilitate operation. It is also provided with a projection 14 which serves as a mechanical stop to limit the angular excursion of shaft 15 to which wheel 7 is attached. That is, projection 14 will engage one side of recess 16 in housing 1 in the "OFF" position and will engage the other edge of recess 16 in the full "ON" position.

The ON-OFF switch and gain control comprises a single component. The power circuit to cell 11 is opened by moving arm 28 of the control completely off the resistance element 29. Resistance element 29 comprises an arcuate insulator member of cylindrical cross section upon which is wound a resistance wire. The terminal ends of the arcuate insulator extend through receiving apertures in circuit board 21. A metal washer 30 is mounted on circuit board 21 and is electrically connected to clip 22 which, in turn, is connected to the positive terminal of cell 11. Arm 28 and wiper 31 are fabricated from a single piece of spring metal such as Phosphor bronze. Wiper 31 continuously rides on washer 30 and arm 28 rides on resistance element 29, except at the limit of its arcuate excursion which corresponds to the "OFF" position. Arm 28 and wiper 31 are rotated by means of thumb wheel 7. Shaft 15 which supports thumb wheel 7 extends through the central aperture of washer 30 and is retained therein by means of retainer 32.

The major circuit components of the amplifier are mounted on circuit board 21 having a generally disk-shaped configuration, and which is provided with a central aperture which fits over the magnet structure of loudspeaker 25. The periphery of circuit board 21 is provided with a flat edge portion 33 to accommodate clips 22 and 23. Circuit board 21 is spaced apart from the cone basket of loudspeaker 25 by means of spacer ring 24, which may be fabricated from plastic or other suitable material. This arrangement can be seen in FIGURE 3.

Figure 4:
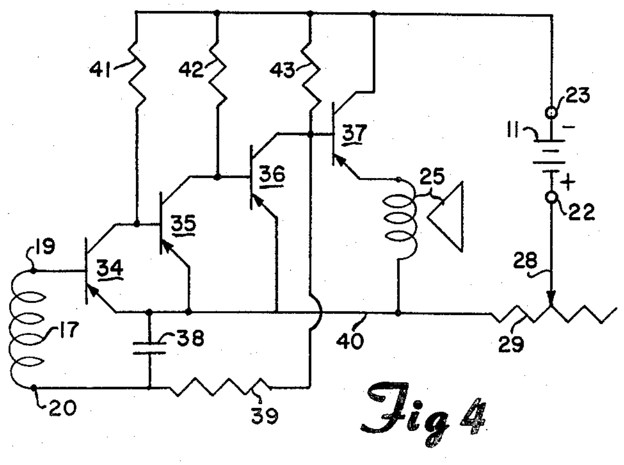
FIGURE 4 is a schematic circuit diagram of the device.

A circuit diagram of a preferred amplifier is shown in FIGURE 4. The signal input is derived from pickup coil 17 which, in a practical construction, may have an impedance of 500 ohms. The output of the pickup coil is connected to a four-stage direct-coupled transistor amplifier. The amplifier comprises transistors 34–37 having having cascaded base-to-collector connections.

The last stage transistor 37 comprises an emitter follower which has in its series circuit a miniature loudspeaker 25.

Lead 19 of pickup coil 17 is connected to the base of input transistor 34 and the alternate lead 20 is returned to the positive terminal (4) of the power supply via coupling capacitor 38. Feedback is provided via resistor 39. The emitters of transistors 34–36 are connected to a common junction 40 and returned to the positive terminal of the cell 11 via gain control 28–29. Operating bias potential for transistors 34–36 is provided by resistors 41–43, respectively. The bias resistors (41–43) are returned to the negative terminal of cell 11.

Voltage amplification is provided by transistors 34–36 and power amplification and impedance matching is provided by the output transistor emitter-follower 37.

The invention described hereinabove resides partly in the physical construction of the device and the interrelationships embodied in the pickup coil 17 and the receiver portion of the telephone handset 4 as herein specifically illustrated, but also embraces the electrical circuit of the apparatus, considered as an integral element, and independently of the structural details of its several parts.

While there has been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention; therefore it is intended that the invention be limited only as indicated by the scope of the following claims.

What is claimed is:

1. A telephone amplifier for attachment to the receiver of a telephone comprising:
   - a frusto-conical cover enclosing one end of said amplifier, shaped to fit snugly against a complementary surface of said receiver;
   - a housing attached to said cover and having a perforate face opposite said cover adapted for placement against the ear;
   - means for detachably securing said frusto-conical cover to said receiver, said detaching means comprising
     - a band secured at each end to said housing and movable into engagement with said telephone;
     - a substantially flat oval pickup coil positioned within said housing adjacent to, and bent to conform to, the interior surface of said cover;
   - a transistor amplifier circuit mounted within said housing and having its input connected to said coil;
   - a loudspeaker connected to the output of said amplifier circuit; and
   - means externally accessible of said housing for adjusting the gain of said amplifier circuit to adjust the level of the loudspeaker output.

2. A telephone amplifier as defined in claim 1 wherein the field of said loudspeaker is isolated from said pickup coil by
   - a magnetic shield adjacent to—and having a surface configuration complementary to—said coil to prevent feedback between said loudspeaker and said coil.

3. A telephone amplifier as defined in claim 1 wherein said amplifier circuit includes
   - a power source;
     - said means for adjusting the gain of said amplifier circuit comprises:
       - a variable resistor in series with said power source and said amplifier circuit.

4. A telephone amplifier as defined in claim 3 wherein said gain adjusting means can increase the resistance of said resistor to infinity to disconnect the power source from the amplifier circuit.

5. A telephone amplifier as defined in claim 3 wherein said amplifier circuit includes:
   - a plurality of direct coupled cascaded transistor stages, one of said stages being directly connected to said pickup coil and another of said stages being directly connected to said loudspeaker.

6. A self-contained amplification device for attachment to the receiver of a telephone comprising:
   - a generally cylindrical housing having a perforate wall to conform to the ear and a frusto-conical wall to conform to a complementary surface of said receiver;
   - elastic means for detachably securing said housing to said receiver;
   - a flat oval pickup coil located adjacent the interior surface of said frusto-conical wall for inductive coupling to the output of said receiver;
   - a shallow conical magnetic shield adjacent to, and having a surface area substantially coextensive with said coil;
   - a loudspeaker located adjacent the interior surface of said perforate wall and on the side of said shield opposite said coil; and transistorized amplifier means located between said pickup coil and said loudspeaker and directly connected therebetween for amplifying said output.

7. A device as defined in claim 6 wherein said amplifier means includes an energizing cell and a variable resistance connected in series therewith for controlling the gain of said amplifier means.

8. In a self-contained amplifier for detachable connection to the receiver of a telephone, a plurality of direct coupled cascaded transistor stages having series base-to-collector connections and a common emitter connection;

a coupling capacitor;

a pickup coil inductively coupled to said receiver, one terminus of said coil being connected to the base of the first stage of said cascaded stages and the other terminus of said coil being connected to said common emitter connection via said coupling capacitor;

an emitter-follower transistor stage, the base of which is connected to the collector of the last stage of said cascaded stages;

a plurality of bias resistors, one for each of said cascaded stages; a loudspeaker;

an energizing cell, one pole of which is connected to said common emitter connection and one terminal of said loudspeaker, and the other pole of which is connected to the collector of said emitter-follower transistor stage and to said plurality of bias resistors.

9. Amplifying apparatus as defined in claim 8 including:

a variable resistance connected in series with said one pole and the common connection between said one terminal and said common emitter connection, for varying the gain of said amplifier.

10. A self-contained telephone amplifier for attachment to the receiver of a telephone, comprising:

a substantially flat oval coil inductively coupled to said receiver:

a magnetic shield adjacent to, and substantially coextensive with, the surface of said coil opposite said receiver:

a transistor amplifier having a plurality of directly-coupled stages, the first stage of which is connected to said coil;

an energizing cell for supplying operating potential to said amplifier;

variable resistance means connected in series with said cell and said transistor amplifier to control the gain of said amplifier; and a loudspeaker located on the side of said shield opposite said coil, and connected to the output stage of said transistor amplifier.

11. A self-contained amplifier as defined in claim 10 wherein said variable resistance means comprises:

an insulating circuit board supporting said transistor amplifier;

an elongate arcuate insulator member having its terminal ends extending through said circuit board;

a resistance wire wound upon said insulator member between points adjacent said terminal ends;

conductive bushing means extending through said circuit board at the vertex of the arcuate dimension of said insulator member;

a unitary wiper arm means having a shaft portion rotatably supported within said bushing means, and having a first spring contact portion slidably engaging said bushing means, and having a second spring contact portion slidably engaging said resistance wire; and thumb wheel means mounted on said wiper arm means for rotation therewith and acting to limit the extent of rotation of said contact portions in one direction of rotation and to disengage said second contact portion from said resistance wire at a given limit in the opposite direction of rotation.

References Cited by the Examiner

UNITED STATES PATENTS

| | | | |
|---|---|---|---|
| Re. 22,198 | 10/42 | Loewe | 179—2 |
| 989,814 | 4/11 | Schwarzhapt | 179—182 |
| 1,558,877 | 10/25 | Hipwell | 179—182 |
| 1,987,413 | 1/35 | Olson | 179—138 |
| 2,498,239 | 2/50 | Berkley | 179—107 |
| 2,847,506 | 8/58 | Gray et al. | 179—107 |
| 2,938,083 | 5/60 | Herrmann | 179—107 |
| 3,075,151 | 1/63 | Murray | 330—32 |
| 3,079,566 | 2/63 | Ebbinge | 330—32 |

ROBERT H. ROSE, *Primary Examiner.*